Sept. 6, 1955 T. W. STEPHENS 2,716,922
SOLENOID OPERATED MAGAZINE SLIDE PROJECTOR
Filed April 15, 1953 2 Sheets-Sheet 1
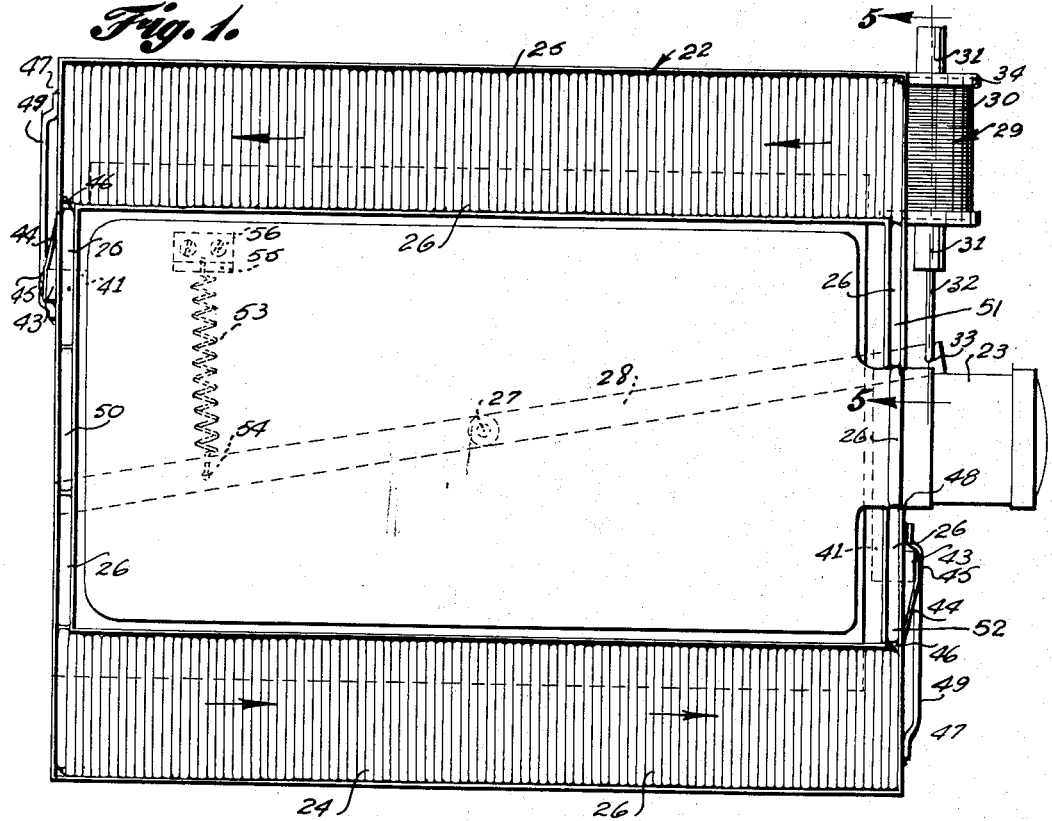
Fig. 1.
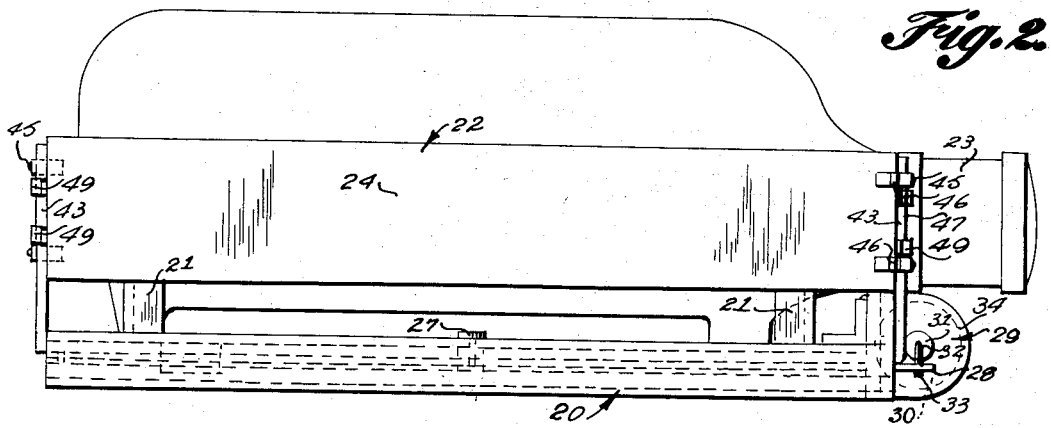
Fig. 2.
Fig. 7.
INVENTOR.
Theron Walter Stephens.
BY Victor J. Evans & Co.
ATTORNEYS

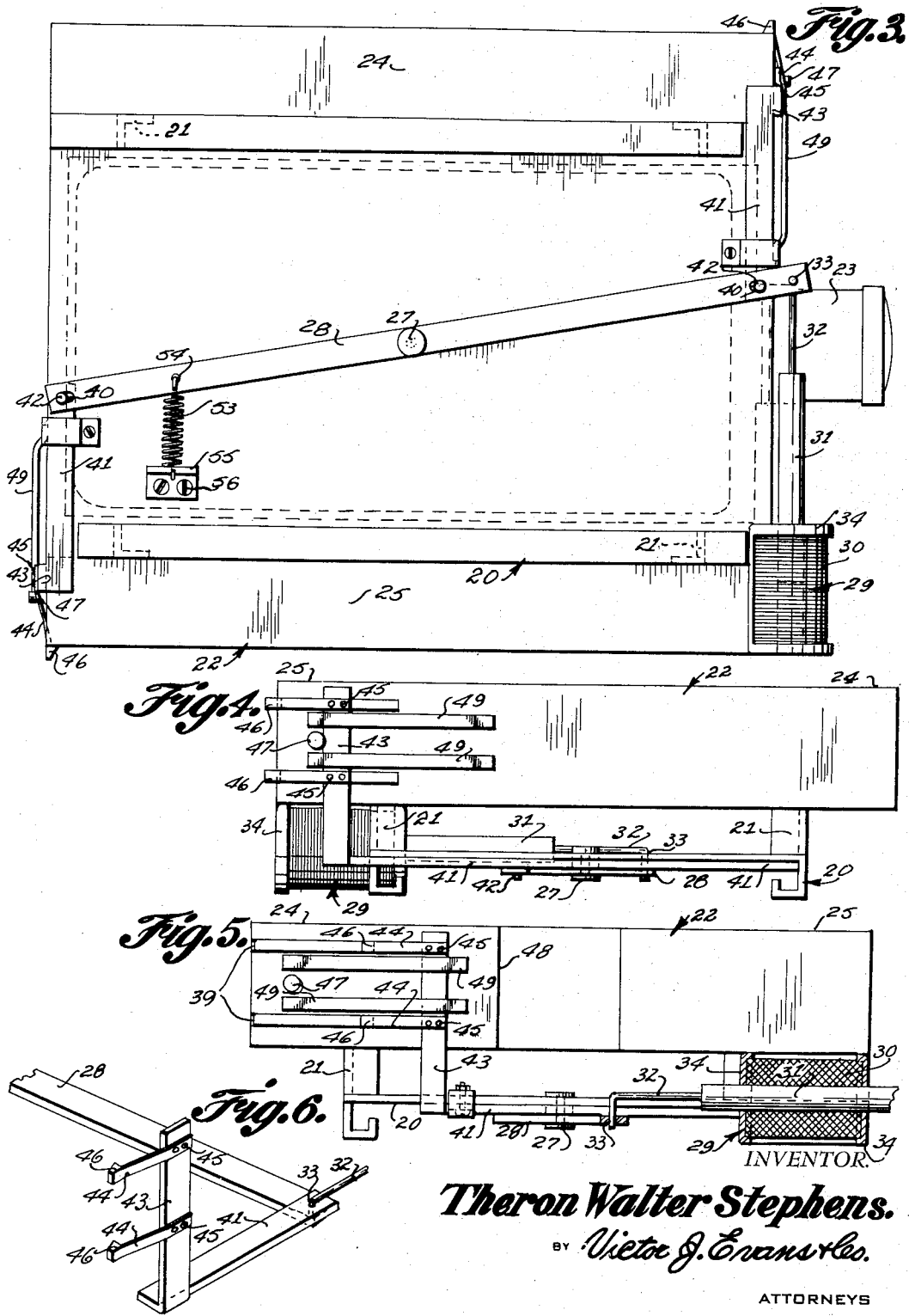

United States Patent Office 2,716,922
Patented Sept. 6, 1955

2,716,922
SOLENOID OPERATED MAGAZINE SLIDE PROJECTOR

Theron W. Stephens, Bakersfield, Calif.

Application April 15, 1953, Serial No. 348,854

2 Claims. (Cl. 88—28)

This invention relates to photographic projection equipment, and more particularly to an automatic slide projector.

The object of the invention is to provide a slide projector for use in viewing photographic slides, the projector being electrically and automatically operated so that a plurality of slides can be viewed continuously.

Another object of the invention is to provide an automatic slide projector which includes a solenoid for intermittently moving an operating lever whereby slides that are to be viewed can be continuously and automatically moved past a lens without requiring the attention of the operator.

Another object of the invention is to provide an electromagnetic slide changer which includes a slide feeding mechanism that is operated intermittently by a solenoid, there being a time switch for controlling operation of the solenoid whereby the slides can be viewed for a predetermined length of time and wherein the projector of the present invention can be used for inside use or for outside advertising purposes.

A further object of the invention is to provide an automatic slide changer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a horizontal sectional view looking down on the projector of the present invention.

Figure 2 is a side elevational view of the projector of the present invention.

Figure 3 is a bottom plan view of the projector.

Figure 4 is an end elevational view of the projector.

Figure 5 is a sectional view taken on the line 5—5 of Figure 1.

Figure 6 is a perspective view showing the operating mechanism for changing the slides.

Figure 7 is a diagrammatic view showing the wiring connection between the time switch and the solenoid.

Referring in detail to the drawings, the numeral 20 designates a base which may be fabricated of any suitable material, and extending upwardly from the base 20 is a plurality of spaced parallel vertically disposed legs 21. A housing or casing 22 is supported on the legs 21 and secured thereto, and the housing 22 may have arranged therein the usual light source which can be connected to a source of electrical energy whereby slides or photographs can be viewed on a screen or the like. Extending forwardly from the front end of the housing 22 is a lens assembly 23 which may consist of one or more magnifying glasses, and arranged on one side of the housing 22 is a trough or container 24. Arranged on the opposite side of the housing 22 is a second trough or container 25, and positioned in each of the troughs 24 and 25 is a plurality of rectangular slides 26 that have been photographically exposed and developed.

A means is provided for continuously and automatically moving the slides 26 one at a time into alignment with the lens 23 whereby each of the slides will be individually projected onto a screen or the like. This means includes a lever 28 which may be pivotally connected to the base 20 by means of a pivot pin 27. A solenoid 29 may be secured to the housing 22 by a bracket 34, and the solenoid 29 includes a coil 30 that has a movable plunger or core 31 arranged therein. A rod 32 has one end secured to the core 31, and the other end of the rod 32 is arranged transversely as at 33 for engagement with an end of the lever 28. Thus, as the solenoid 29 is actuated, the core 31 will be moved in and out of the coil 30 whereby the lever 28 will be pivoted about the pin 27 so that the slides 26 will be moved continuously past the lens 23.

For controlling the actuation of the solenoid 29, a time switch 35 is electrically connected to the solenoid 29 by means of a wire 36, there being a suitable wire 37 leading from the solenoid 29 to a plug 38, and the plug 38 may be connected to any suitable source of electrical energy. Thus, the time switch 35 may be of the type that permits the solenoid 29 to remain energized for a predetermined length of time as for example 40 seconds, so that each of the slides 26 will remain in alignment with the lens 23 and after which the slide 26 will be moved away from the lens 23 by the next succeeding slide 26 that is to be viewed or projected onto a screen.

Each end of the lever 28 is provided with an opening or slot 40, and arranged adjacent each end of the lever 28 is a bar 41. The bar 41 includes a pin 42 that projects through the slot 40 in the lever 28. Thus, as the lever 28 is pivoted the bars 41 will likewise be moved. Arranged at right angles with respect to each of the bars 41 and secured thereto is an arm 43, and extending from each of the arms 43 is a pair of fingers 44. The fingers 44 may be secured to the arm 43 by suitable securing elements such as rivets 45, and the outer end of each of the fingers 44 is provided with a tapered lug 46. The lugs 46 are adapted to move through a pair of slots 39 which communicate with the end of the trough 24 and with the end of the trough 25. These lugs 46 are adapted to engage the slides 26 in order to move the slides 26 as the lever 28 is actuated by the solenoid 29. A stop member 47 is provided for limiting movement of each of the arms 43, Figures 4 and 5. The numeral 48 designates an opening which is in alignment with the lens 23 so that when the slides 26 register with the opening 48 the slides 26 will be projected onto the screen. A pair of guide members 49 may be secured to each end of the housing for guiding the arms 43 during their sliding movement, the arms 43 being slidably mounted within the guide members 49.

Arranged in the rear portion of the housing 22 is a passageway or chamber 50 through which the slides 26 pass whereby the slides 26 will be moved from the trough 25 to the rear end of the trough 24 by means of the lugs 46 when the solenoid is energized. There is provided in the front end of the housing 22 a passageway 52 which communicates with the front end of the container 24, and the passageway 52 also registers with the lens opening 48. There is also provided a passageway or chamber 51 which leads from the lens opening 48 to the front end of the trough 25.

There is further provided a coil spring 53 which has a hook formed on one end for engagement with an opening 54 in the lever 28. The other end of the spring 53 is connected to a bracket 55 that may be secured to the base by suitable securing elements such as screws 56, Figure 3.

In use, the compartments or troughs 24 and 25 are filled with the slides 26. The slides 26 follow the direction of the arrow through the trough 24, and the slides 26 follow the direction of the arrow through the trough 25. Thus, the slides 26 pass from the back end to the front end of the trough 24 then through the passageway 52 and into alignment with the lens 23. The slides then pass through the passageway 50 to the front end of the trough 25 then pass rearwardly through the trough 25. As the slides 26 pass through these passageways they force or push the slides ahead of each other so that all of the slides move a certain distance as each slide is moved by the lugs 46. The slides 26 leaving the rear end of the trough 25 pass through the passageway 50 and enter the rear end of the trough 24 and this cycle can be repeated. The movement of the slides 26 is controlled by the solenoid 29 since the core 31 is reciprocated as the solenoid 29 is actuated or energized. The length of time that the solenoid 29 is energized is controlled by the time switch 35 which may be set so that each of the slides 26 remains in front of the lens 23 a predetermined interval of time, as for example 40 seconds. The coil spring 53 serves to return the lever 28 to its normal position as shown in Figure 3 when the solenoid 29 is deenergized by the time switch 35.

From the foregoing, it is apparent that an electromagnetic slide changer has been provided. The time switch 35 controls the length of time that each slide will be in position to be projected on the screen and it will be seen that there are no empty spaces in the various passageways or compartments so that the slides push each other along as they themselves are pushed by the lugs 46. In Figure 1 the solenoid 29 is energized so that the coil spring 53 is extended, and when the solenoid 29 is deenergized, the coil spring 53 returns to the position shown in Figure 3. By providing an extension on the troughs, a great number of slides can be shown continuously without requiring the attention of the operator. It will be noted that a pair of the lugs 46 are provided on the front end and also on the rear end of the projector for moving the slides. The parts can be made of any suitable material and the slides 26 may have a certain amount of rigidity. An electric button can be used in lieu of the time clock 35.

I claim:

1. An automatic slide projector comprising a base, a housing supported above said base, a lens assembly extending forwardly from said housing, a slide feeding trough arranged on one side of said housing, a slide receiving container arranged on the opposite side of said housing, there being a passageway interconnecting the rear ends of said trough and container together, there being a passageway interconnecting the front ends of said trough and container together, means for automatically moving the slides through said passageways and past said lens assembly, said means comprising a lever pivotally mounted in said base, a solenoid mounted on the front of said housing and including a movable core, a rod connecting said core to the front end of said lever, a bar arranged transversely with respect to each end of said lever and secured thereto, an arm extending at right angles with respect to said bar and secured thereto, a pair of spaced parallel fingers projecting from each of said arms and each provided with a tapered lug for engagement with said slides, there being a pair of spaced parallel slots communicating with said passageways for the slidable projection therethrough of said lugs, a bracket secured to said base, a coil spring having one end connected to said bracket and its other end connected to said lever, and a time switch electrically connected to said solenoid.

2. An automatic slide projector comprising a base, a housing supported above said base, a lens assembly extending forwardly from said housing, a slide feeding trough arranged on one side of said housing, a slide receiving container arranged on the opposite side of said housing, there being a passageway interconnecting the rear ends of said trough and container together, there being a passageway interconnecting the front ends of said trough and container together, means for automatically moving the slides through said passageways and past said lens assembly, said means comprising a lever pivotally mounted in said base, a solenoid mounted on the front of said housing and including a movable core, a rod connecting said core to said lever, a bar arranged transversely with respect to each end of said lever and secured thereto, an arm extending at right angles with respect to said bar and secured thereto, a pair of fingers projecting from each of said arms and each provided with a lug for engagement with said slides, there being a pair of slots communicating with said passageways for the slidable projection therethrough of said lugs, a bracket secured to said base, resilient means connected to said bracket and to said lever, and a time switch electrically connected to said solenoid.

References Cited in the file of this patent

UNITED STATES PATENTS

| | | |
|---|---|---|
| 590,903 | Newman | Sept. 28, 1897 |
| 1,288,730 | Stanfield | Dec. 24, 1918 |
| 1,581,127 | Jones | Apr. 20, 1926 |
| 1,624,669 | Lehwess | Apr. 12, 1927 |
| 1,839,545 | Frye | Jan. 5, 1932 |

FOREIGN PATENTS

| | | |
|---|---|---|
| 234,555 | Germany | May 13, 1911 |